(12) United States Patent
Kanke

(10) Patent No.: US 9,229,181 B2
(45) Date of Patent: Jan. 5, 2016

(54) OPTICAL RECEPTACLE AND OPTICAL MODULE COMPRISING SAME

(71) Applicant: ENPLAS CORPORATION, Kawaguchi-shi, Saitama (JP)

(72) Inventor: Shinya Kanke, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/386,729

(22) PCT Filed: Mar. 19, 2013

(86) PCT No.: PCT/JP2013/057757
§ 371 (c)(1),
(2) Date: Sep. 19, 2014

(87) PCT Pub. No.: WO2013/146449
PCT Pub. Date: Oct. 3, 2013

(65) Prior Publication Data
US 2015/0071593 A1  Mar. 12, 2015

(30) Foreign Application Priority Data
Mar. 28, 2012 (JP) ................. 2012-073780

(51) Int. Cl.
*G02B 6/42* (2006.01)
*G02B 6/43* (2006.01)
*G02B 6/32* (2006.01)

(52) U.S. Cl.
CPC ............ *G02B 6/4214* (2013.01); *G02B 6/4286* (2013.01); *G02B 6/43* (2013.01); *G02B 6/32* (2013.01); *G02B 6/423* (2013.01); *G02B 6/4249* (2013.01); *G02B 6/4255* (2013.01)

(58) Field of Classification Search
CPC ........ G02B 6/32; G02B 6/4214; G02B 6/423; G02B 6/4249; G02B 6/4255; G02B 6/4286; G02B 6/43
USPC ........................................................... 385/89
See application file for complete search history.

(56) References Cited

U.S. PATENT DOCUMENTS 5,515,468 A * 5/1996 DeAndrea et al. ............. 385/88
6,368,890 B1 * 4/2002 Wickstrom et al. ............ 438/29
(Continued)

FOREIGN PATENT DOCUMENTS

| JP | 2000-340877 A | 12/2000 | |
|---|---|---|---|
| JP | 2000340877 A * | 12/2000 | .............. H01S 5/022 |

(Continued)

OTHER PUBLICATIONS

International Search Report (ISR) mailed Jun. 25, 2013, issued for International application No. PCT/JP2013/057757.

*Primary Examiner* — Peter Radkowski
(74) *Attorney, Agent, or Firm* — Law Office of Katsuhiro Arai

(57) ABSTRACT

An optical receptacle is capable of actualizing, at low cost, optical transmission accompanying monitoring in which light of a light-emitting element is extracted in a direction along a substrate at an optical transmission body. In an embodiment, light of a light-emitting element 7 that has been incident on a first surface 2a (11) is separated into coupling light and monitor light using total reflection at a coupling light total reflection surface 14 and a first monitor light total reflection surface 15. The coupling light is emitted towards an optical transmission body 5 from a third surface 2c (12), and the monitor light is emitted towards a light-receiving element 8 from the first surface 2a (13).

10 Claims, 10 Drawing Sheets

(56) References Cited

U.S. PATENT DOCUMENTS

| | | | |
|---|---|---|---|
| 6,600,845 B1 * | 7/2003 | Feldman et al. | 385/14 |
| 6,678,292 B2 * | 1/2004 | Wickstrom et al. | 372/32 |
| 2003/0174962 A1* | 9/2003 | Poole et al. | 385/48 |
| 2004/0175072 A1* | 9/2004 | Lam et al. | 385/33 |
| 2005/0175347 A1* | 8/2005 | Ray et al. | 398/88 |
| 2006/0002651 A1* | 1/2006 | Shimizu et al. | 385/14 |
| 2007/0104416 A1* | 5/2007 | Shimizu et al. | 385/14 |
| 2008/0142815 A1* | 6/2008 | Morioka | 257/81 |
| 2010/0295063 A1* | 11/2010 | Morioka | 257/80 |
| 2011/0057204 A1* | 3/2011 | Morioka | 257/84 |
| 2011/0075132 A1* | 3/2011 | Sutherland | 356/138 |
| 2012/0263416 A1* | 10/2012 | Morioka | 385/33 |
| 2013/0004167 A1* | 1/2013 | Kim | 398/43 |

FOREIGN PATENT DOCUMENTS

| | | | |
|---|---|---|---|
| JP | 2004-221420 A | | 8/2004 |
| JP | 2006-017885 A | | 1/2006 |
| JP | 2006017885 A | * | 1/2006 |
| JP | 2008-151894 A | | 7/2008 |
| JP | 2008151894 A | * | 7/2008 |
| JP | 2011133807 A | * | 7/2011 |
| WO | 2011/077723 A1 | | 6/2011 |

* cited by examiner

OPTICAL RECEPTACLE AND OPTICAL MODULE COMPRISING SAME

This application is the U.S. National Phase under 35 U.S.C. §371 of International Application PCT/JP2013/057757, filed Mar. 19, 2013, which claims priorities to Japanese Patent Application No. 2012-073780, filed Mar. 28, 2012. The International Application was published under PCT Article 21(2) in a language other than English.

TECHNICAL FIELD

The present invention relates to an optical receptacle and an optical module including the optical receptacle. In particular, the present invention relates to an optical receptacle suitable for optically coupling a light-emitting element and an optical transmission body, and an optical module including the optical receptacle.

BACKGROUND ART

Since the past, an optical module has been used in optical communication using optical fibers, the optical module including a light-emitting element such as a surface light-emitting laser. For example, a vertical cavity surface emitting laser (VCSEL).

In this type of optical module, an optical module component referred to as an optical receptacle is used. The optical receptacle is used in optical transmission via optical fiber by light that includes communication information and has been emitted from the light-emitting element being coupled with an end face of the optical fiber.

In addition, since the past, various proposals have been made regarding the optical module to monitor the light (intensity and amount of light) emitted from the light-emitting element, for the purpose of stabilizing output characteristics of the light-emitting element against temperature changes and adjusting optical output.

For example, Patent Literature 1 and Patent Literature 2 propose the use of a photoelectric conversion device in which a light-receiving element for monitoring is enclosed together with a light-emitting element in a package referred to as a TO-CAN. Some of the outgoing light from the light-emitting element is reflected to the light-receiving element side as monitor light at a glass window of the package.

However, in a CAN-package type photoelectric conversion device such as this, during high-frequency drive, crosstalk occurs in some instances as a result of electromagnetic waves leaking from a section of wiring connected to the light-emitting element. In such instances, support of high-speed communication of 10 Gbps or more becomes difficult. Furthermore, in the module using the CAN package, the maximum diameter of the optical receptacle is 6 to 7 mm in, for example, a CAN referred to as TO-46. Therefore, size reduction is difficult.

On the other hand, in a substrate-mounted photoelectric conversion device in which the light-emitting element is mounted on a circuit board, unlike the CAN-package type, there are no issues regarding crosstalk. In addition, there are advantages, such as reduced number of components, reduced cost, and reduced size. However, because a glass window is not provided, it is difficult to include a function for generating monitor light on the photoelectric conversion device side.

Therefore, for example, as shown in Patent Literature 3, proposals have been made to actualize stable high-speed communication accompanying monitoring by a reflective surface for reflecting some of the outgoing light from the light-emitting element towards the light-receiving element side as monitor light being formed on the optical receptacle side to support the substrate-mounted photoelectric conversion device.

PRIOR ART LITERATURES

Patent Literatures

Patent Literature 1: Japanese Patent Laid-open Publication No. 2000-340877
Patent Literature 2: Japanese Patent Laid-open Publication No. 2004-221420
Patent Literature 3: Japanese Patent Laid-open Publication No. 2008-151894

DISCLOSURE OF INVENTION

Problem to be Solved by the Invention

The invention described in above-described Patent Literature 3 is configured such that, after the light from the light-emitting element has passed through the optical receptacle, the light is extracted in a direction perpendicular to the substrate of the photoelectric conversion device at the end face of the optical fiber.

However, depending on the format of use of the optical module, in some instances, the light from the light-emitting element is required to be extracted in a direction along the substrate at the end face of the optical fiber. In such instances, to favorably actualize optical transmission accompanying monitoring, a new method is required that is different from the invention described in Patent Literature 3 and in which the light extraction direction differs.

Therefore, the present invention has been achieved in light of the above-described issues. An object of the present invention is to provide an optical receptacle capable of appropriately actualizing optical transmission accompanying monitoring at low cost, in which light from a light-emitting element is extracted in a direction along a substrate at an optical transmission body, and an optical module including the optical receptacle.

Means for Solving Problem

To achieve the above-described object, an optical receptacle according to a first aspect of the present invention is an optical receptacle that is capable of optically coupling a light-emitting element and an optical transmission body in a state in which the optical receptacle is disposed between a photoelectric conversion device and the optical transmission body, in which photoelectric conversion device the light-emitting element and a light-receiving element that receives monitor light for monitoring light emitted from the light-emitting element are disposed on a substrate. The optical receptacle includes: a first surface in an optical receptacle main body, on which the light from the light-emitting element is incident and from which the monitor light directed towards the light-receiving element is emitted; a coupling light total reflection surface that is disposed on a second surface on a side opposite to the first surface in the optical receptacle main body so as to have a predetermined first slope angle in relation to the first surface, on which a portion of light, of the light of the light-emitting element that has been incident on the first surface, is internally incident at an angle of incidence that is greater than a critical angle, and that totally reflects the internally incident portion of light towards the optical transmission body side as coupling light to be coupled with the optical transmission body; a third surface in the optical receptacle main body from which the coupling light that has been totally reflected by the coupling light total reflection surface is emitted towards the optical transmission body; a first monitor light total reflection surface that is disposed on the second surface so as to be adjacent to the coupling light total reflection surface and have a predetermined second slope angle or the first slope angle in relation to the first surface, on which a remaining portion of light other than the portion of light, of the light of the light-emitting element that has been incident on the first surface, is internally incident at an angle of incidence that is greater than the critical angle, and that totally reflects the internally incident remaining portion of light towards the third surface side as monitor light, in a state separated from the coupling light or a state integrated with the coupling light; and a second monitor light total reflection surface that is disposed on the second surface in a position on the side of the total reflection direction of the monitor light in relation to the first monitor light total reflection surface so as to have a predetermined third slope angle in relation to the first surface so as to deviate from the optical path of the coupling light, on which the monitor light that has been totally reflected at the first monitor light total reflection surface is internally incident at an angle of incidence that is greater than the critical angle, and that totally reflects the internally incident monitor light towards a position corresponding to the light-receiving element on the first surface.

In the invention according to the first aspect, the light of the light-emitting element that has been incident on the first surface can be divided into the coupling light and the monitor light by total reflection at the coupling light total reflection surface and total reflection at the first monitor light total reflection surface or the second monitor light total reflection surface. Therefore, optical communication accompanying monitoring in which the light of the light-emitting element is extracted in a direction along the substrate can be appropriately actualized at low cost by only the surface shapes of the optical receptacle main body. In addition, as a result of the total reflection direction of the monitor light being on the third surface side in relation to the first monitor light total reflection surface, size reduction and further cost reduction of the optical receptacle main body can be achieved.

In addition, an optical receptacle according to a second aspect of the present invention is the optical receptacle according to the first aspect in which, further, the first monitor light total reflection surface totally reflects the monitor light in a state separated from the coupling light by being disposed so as to have the second slope angle in relation to the first surface. The coupling light total reflection surface and the first monitor light total reflection surface are disposed so as to be in point-contact in a direction perpendicular to the internal incidence direction of the light of the light-emitting element and the total reflection direction of the coupling light and the monitor light, or in linear-contact in the total reflection direction of the coupling light and the monitor light. The second monitor light total reflection surface is composed of an inner sloped surface of a recessing section that is formed on the second surface in a recessing manner.

In the invention according to the second aspect, the monitor light is separated from the coupling light at the first monitor light total reflection surface. Therefore, freedom of layout of the second monitor light total reflection surface based on design concept can be widened. For example, an instance in which the recessing section having the second monitor light total reflection surface is deeply formed and reduction in the amount of use of the optical receptacle material is achieved, and an instance in which the recessing section is shallowly formed and improved releasability and improved mechanical strength are achieved when the optical receptacle is resin-molded using a mold can be flexibly supported. At this time, when the coupling light total reflection surface and the first monitor light total reflection surface are disposed so as to be in point-contact in the direction perpendicular to the internal incidence direction of the light of the light-emitting element and the total reflection direction of the coupling light and the monitor light, a concept of deeply forming the recessing section can be supported with certainty. On the other hand, when the coupling light total reflection surface and the first monitor light total reflection surface are disposed so as to be in linear-contact in the total reflection direction of the coupling light and the monitor light, the coupling light total reflection surface and the first monitor light total reflection surface can be directly connected without a stepped surface therebetween. Surface area can thereby be reduced. Therefore, a configuration more suitable for the concept of improving releasability by shallowly forming the recessing section can be actualized (synergetic effects regarding releasability can be expected).

Furthermore, an optical receptacle according to a third aspect of the present invention is the optical receptacle according to the second aspect in which, further, the coupling light total reflection surface and the first monitor light total reflection surface are disposed so as to be in point-contact. The second monitor light total reflection surface is disposed further towards the first surface side than the optical path of the coupling light.

In the invention according to the third aspect, as described above, the amount of use of the optical receptacle material can be reduced by the recessing section being deeply formed. Therefore, further cost reduction can be achieved.

Still further, an optical receptacle according to a forth aspect of the present invention is the optical receptacle according to the second aspect in which, further, the second monitor light total reflection surface is disposed further towards the second surface side than the optical path of the coupling light.

In the invention according to the forth aspect, as described above, releasability can be improved by the recessing section being shallowly formed. Furthermore, further cost reduction due to improved yield can be achieved.

In addition, an optical receptacle according to a fifth aspect of the present invention is the optical receptacle according to any one of the second to forth aspects in which, further, a plurality of first monitor light total reflection surfaces and second monitor light total reflection surfaces are disposed.

In the invention according to the fifth aspect, increase in the amount of monitor light and monitoring using a plurality of light-receiving elements can be supported.

Furthermore, an optical receptacle according to a sixth aspect of the present invention is the optical receptacle according to any one of the second to forth aspects in which, further, the coupling light total reflection surface and the first monitor light total reflection surface are disposed so as to be in linear-contact. The first monitor light total reflection surface is disposed towards the side of the total reflection direction of the coupling light in relation to the coupling light total reflection surface.

In the invention according to the sixth aspect, optical path design can be facilitated when the recessing section is shallowly formed.

Still further, an optical receptacle according to a seventh aspect of the present invention is the optical receptacle according to the first aspect in which, further, the first monitor light total reflection surface totally reflects the monitor light in a state integrated with the coupling light by being disposed so as to have the first slope angle in relation to the first surface, and the monitor is separated from the coupling light at the second monitor light total reflection surface.

In the invention according to the seventh aspect, the first monitor light total reflection surface and the coupling light total reflection surface can be formed into a co-planar shape. Therefore, the configuration can be simplified and further cost reduction can be achieved.

In addition, an optical receptacle according to an eighth aspect of the present invention is the optical receptacle according to any one of the first to seventh aspects in which, further, a first lens face that enables the light of the light-emitting element to be incident towards the coupling light total reflection surface and the first monitor light total reflection surface is disposed on the first surface in a position corresponding to the light-emitting element. A second lens face that emits the coupling light towards the optical transmission body is disposed on the third surface. A third lens face that emits the monitor light towards the light-receiving element is disposed on the first surface in a position corresponding to the light-receiving element.

In the invention according to the eighth aspect, coupling efficiency of the coupling light and the monitor light can be improved by use of lens faces.

Furthermore, an optical module according to a ninth aspect of the present invention includes: the optical receptacle according to any one of the first to eighth accepts; and the photoelectric conversion device according to the first aspect.

In the invention according to the ninth aspect, the light of the light-emitting element that has been incident on the first surface can be separated into the coupling light and the monitor light by total reflection at the coupling light total reflection surface and total reflection at the first monitor light total reflection surface or the second monitor light total reflection surface. Therefore, optical transmission accompanying monitoring in which the light of the light-emitting element is extracted in a direction along the substrate at the optical transmission body can be appropriately actualized at low cost by only the surface shapes of the optical receptacle main body.

Effect of the Invention

In the present invention, optical transmission accompanying monitoring in which the light from the light-emitting element is extracted in a direction along the substrate at the optical transmission body can be appropriately actualized at low cost.

BEST MODE(S) FOR CARRYING OUT THE INVENTION

An embodiment of an optical receptacle and an optical module including the optical receptacle of the present invention will be described with reference to FIG. 1 to FIG. 29.

Figure 1:
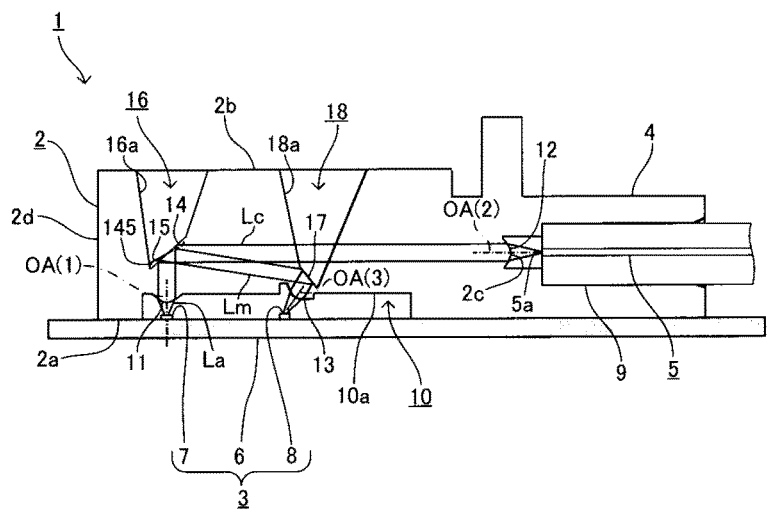
FIG. 1 A schematic configuration diagram of an optical receptacle and an optical module including the optical receptacle of the present invention FIG. 2 A planar view of the optical receptacle shown in FIG. 1
Figure 2:
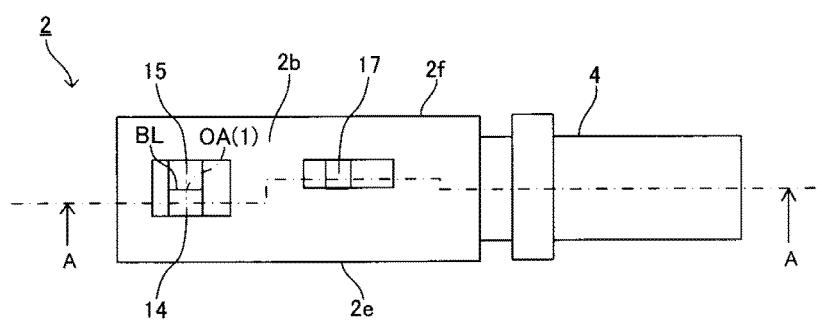
Figure 3:
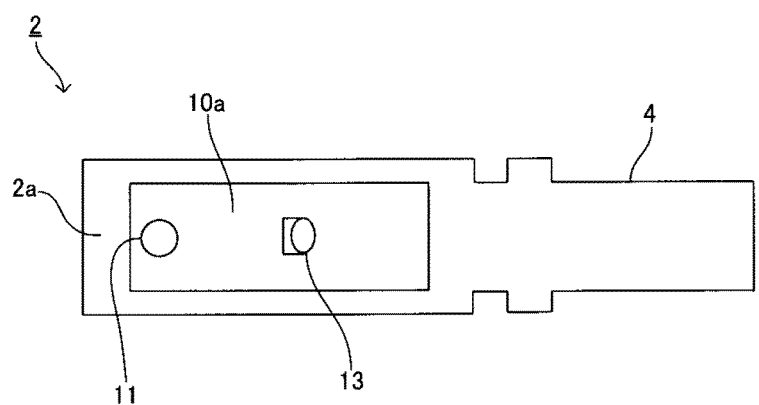
FIG. 3 A bottom view of the optical receptacle shown in FIG. 1

FIG. 1 is a schematic configuration diagram showing an overview of an optical module 1 according to the present embodiment together with a vertical cross-sectional view of an optical receptacle 2 according to the present embodiment. In addition, FIG. 2 is a planar view of the optical receptacle 2 shown in FIG. 1. Furthermore, FIG. 3 is a bottom view of the optical receptacle 2 shown in FIG. 1. The outer shape of the optical receptacle 2 shown in FIG. 1 corresponds to the cross-sectional shape taken along A-A in FIG. 2.

As shown in FIG. 1, the optical receptacle 2 (optical receptacle main body) according to the present embodiment is disposed between a photoelectric conversion device 3 and an optical fiber 5 that serves as an optical transmission body.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a of the optical receptacle 2. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light Lm for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor light Lm received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is attached, together with a circular-cylindrical ferrule 9 that holds this section, within a cylindrical optical fiber attaching section 4 that is formed in the optical receptacle 2. In this attached state, the section of the optical fiber 5 on the end face 5a side (the section housed within the optical fiber attaching section 4) is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5.

The optical receptacle 2 will be described in further detail. As shown in FIG. 1, the outer shape of a main section of the optical receptacle 2 having various optical surfaces is formed into a substantially rectangular shape. In other words, as shown in FIG. 1 and FIG. 2, the main section of the optical receptacle 2 configures an overall outer shape by the horizontal lower end surface 2a that serves as a first surface, an upper end surface 2b that serves as a second surface, a right end surface 2c that serves as a third surface, a left end surface 2d, a front end surface 2e, and a rear end surface 2f. The lower end surface 2a and the upper end surface 2b are parallel with each other. The above-described optical fiber attaching section 4 is formed so as to extend towards the right side from the right end surface 2d.

The optical receptacle 2, such as that described above, may be integrally formed by injection molding using a resin material such as polyetherimide.

As shown in FIG. 1, a first recessing section 10 is formed on the lower end surface 2a of the optical receptacle 2, the first recessing section 10 having a substantially rectangular cross-sectional shape that recesses upwards in relation to the lower end surface 2a. An inner bottom surface 10a of the first recessing section 10 is formed parallel with the lower end surface 2a. As shown in FIG. 1, a single first lens face 11 is formed on the inner bottom surface 10a of the first recessing section 10 in a position near the left end portion facing (corresponding to) the light-emitting element 7. The first lens face 11 is formed having a circular shape in a bottom view (FIG. 3), and is formed into a spherical or aspherical convex lens of which the convex surface faces the light-emitting element 7 side. The position of an optical axis OA(1) on the first lens face 11 preferably matches (is positioned at) the center portion of the light-emitting element 7 in the outgoing direction of the laser light La. In addition, the axial direction of the optical axis OA(1) on the first lens face 11 may be perpendicular to the inner bottom surface 10a of the first recessing section 10.

As shown in FIG. 1, in a state in which the photoelectric conversion device 3 is attached to the optical receptacle 2, the laser light La emitted from the light-emitting element 7 is incident on the first lens face 11, such as that described above, from below. Then, the first lens face 11 converges (for example, collimates) the incident laser light La and advances the laser light La into the interior of the optical receptacle 2.

Figure 4:
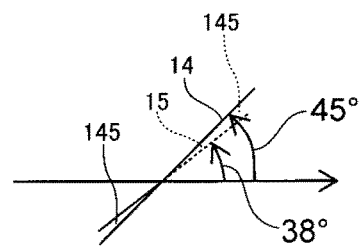
FIG. 4 An enlarged cross-sectional view of a first main section of the optical receptacle shown in FIG. 1
Figure 5:
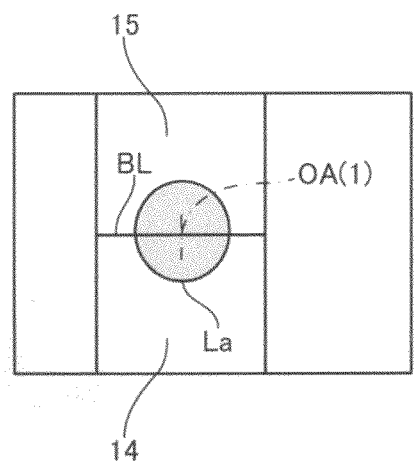
FIG. 5 An enlarged planar view of a main section of the optical receptacle shown in FIG. 1

In addition, as shown in FIG. 1 and FIG. 2, a coupling light total reflection surface 14 and a first monitor light total reflection surface 15 are disposed on the upper end surface 2b in a position opposing the first lens face 11 from above. As shown in FIG. 2 and FIG. 4, the coupling light total reflection surface 14 and the first monitor light total reflection surface 15 are disposed so as to be in point-contact with each other in the vertical direction in FIG. 2 (the direction perpendicular to the paper on which FIG. 1 is printed) (referred to, hereinafter, as parallel disposition). The direction of a disposition (contact) such as this corresponds to a direction perpendicular to the direction of internal incidence of the laser light La onto both total reflection surfaces 14 and 15, and the direction of total reflection of the fiber coupling light Lc and the monitor light Lm. As shown in FIG. 2 and FIG. 5, the coupling light total reflection surface 14 and the first monitor light total reflection surface 15 form the only boundary line BL that extends in the lateral direction in FIG. 2 and FIG. 5 between both total reflection surfaces 14 and 15, in the planar view. In addition, the optical axis OA(1) on the first lens face 11 is included on the boundary line BL. Furthermore, as shown in FIG. 4, the coupling light total reflection surface 14 is formed into a sloped plane that has a slope angle of 45° (example of a first slope angle) in the counter-clockwise direction in FIG. 4 in relation to the lower end surface 2a. However, in FIG. 4, the slope angle of the coupling light total reflection surface 14 is set with reference to an arrow that is parallel with the lower end surface 2a, for convenience. However, it goes without saying that, when the slope angle is set with reference to the actual lower end surface 2a, the same slope angle (45°) will be obtained. Furthermore, as shown in FIG. 4, the first monitor light total reflection surface 15 is formed into a sloped plane that has a slope angle of 38° (example of a second slope angle) in the counterclockwise direction in FIG. 4 in relation to the lower end surface 2a. Still further, the coupling light total reflection surface 14 and the first monitor light total reflection surface 15 that have differing slope angles in this way are connected by a stepped surface 145 that is parallel with the optical axis OA(1) in portions other than the point-contact portion. In addition, as shown in FIG. 1, the coupling light total reflection surface 14 and the first monitor light total reflection surface 15 are composed only of the inner bottom surface of a second recessing section 16 that is formed on the upper end surface 2b in a recessing manner. In FIG. 2, the coupling light total reflection surface 14 is disposed towards the front (front end surface 2e), and the first monitor light total reflection surface 15 is disposed towards the rear (rear end surface 2f). However, the front and rear positioning may be reversed. In addition, as shown in FIG. 1, a draft angle (sloped plane) may be formed on an inner surface 16a of the second recessing section 16 to ensure releasability when the optical receptacle 2 is resin-molded using a mold.

Here, as shown in FIG. 1 and FIG. 5, a portion of laser light La (lower half portion of the light beam cross-section shown in FIG. 5) of the laser light La from the light-emitting element 7 that has passed through the first lens face 11 is internally incident on the coupling light total reflection surface 14 at an angle of incidence that is greater than the critical angle from the lower side in FIG. 1 (interior of the optical receptacle 2). Then, the coupling light total reflection surface 14 totally reflects the internally incident portion of laser light La towards the right side in FIG. 1 as the fiber coupling light Lc to be coupled with the end face 5a of the optical fiber 5. When Ultem (registered trademark), manufactured by SABIC, is used as a forming material of the optical receptacle 2, refraction in relation to a wavelength of 850 nm is 1.64. Therefore, the critical angle in this instance is substantially 38°.

On the other hand, as shown in FIG. 1 and FIG. 5, the remaining portion of laser light La (upper half of the light beam cross-section shown in FIG. 5) of the laser light La from the light-emitting element 7 that has passed through the first lens face 11, other than the light incident on the coupling light total reflection surface 14, is internally incident on the first monitor light total reflection surface 15 at an angle of incidence that is greater than the critical angle from the lower side in FIG. 1 (interior of the optical receptacle 2). Then, the first monitor light total reflection surface 15 totally reflects the internally incident remaining portion of laser light La towards the lower right side in FIG. 1 as the monitor light Lm, in the state separated from the fiber coupling light Lc.

Figure 6:
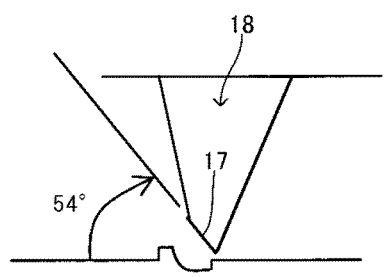
FIG. 6 An enlarged cross-sectional view of a second main section of the optical receptacle shown in FIG. 1

Furthermore, as shown in FIG. 1 and FIG. 2, a second monitor light reflection surface 17 is disposed on the upper end surface 2b in a position on the side of the total reflection direction of the monitor light Lm in relation to the first monitor light total reflection surface 15. As shown in FIG. 6, the second monitor light total reflection surface 17 is formed into a sloped plane that has a slope angle of 54° (example of a third slope angle) in the clockwise direction in FIG. 6 in relation to the lower end surface 2a. As shown in FIG. 1, the second monitor light total reflection surface 17 is composed only of the inner bottom surface of a third recessing section 18 that is formed on the upper end surface 2b in a recessing manner so as to deviate from the optical path of the fiber coupling light Lc. In addition, according to the present embodiment, the third recessing section 18 is formed so as to recess deeply towards the lower end surface 2a side. Therefore, as shown in FIG. 1, the second monitor light total reflection surface 17 is positioned further towards the lower end surface 2a side (below) than the optical path of the fiber coupling light Lc. As shown in FIG. 1, a draft angle (sloped plane) may be formed on an inner surface 18a of the third recessing section 18 to ensure releasability when the optical receptacle 2 is resin-molded using a mold.

As shown in FIG. 1, the monitor light Lm that has advanced on the optical path within the optical receptacle 2 after being totally reflected by the first monitor light total reflection surface 15 is internally incident on the second monitor light total reflection surface 17, such as that described above, at an angle of incidence that is greater than the critical angle from the upper left side in FIG. 1. Then, the second monitor light total reflection surface 17 totally reflects the internally incident monitor light Lm towards the lower left side that is on the light-receiving element 8 side.

Still further, as shown in FIG. 1, the right end surface 2c of the main section of the optical receptacle 2 is formed into a second lens face 12 that faces the end face 5a of the optical fiber 5 the second lens face 12 is formed having a circular outer peripheral shape and is formed into a spherical or aspherical convex lens face of which the convex surface faces the side of the end face 5a of the optical fiber 5. An optical axis OA(2) on the second lens face 12 is preferably positioned on a normal of the center portion of the end face 5a of the optical fiber 5.

As shown in FIG. 1, the fiber coupled light Lc that has advanced on the optical path within the optical receptacle 2 after being totally reflected by the coupling light total reflection surface 14 is internally incident on the second lens face 12, such as that described above, from the left side in FIG. 1.

Then, the second lens face 12 converges the internally incident fiber coupling light Lc and emits the fiber coupling light Lc towards the end face 5a of the optical fiber 5. The fiber coupling light Lc is coupled with the end face 5a of the optical fiber 5 in this way.

In addition, as shown in FIG. 1 and FIG. 3, a third lens face 13 is formed on the inner bottom surface 10a of the first recessing section 10 in a position to the right of the first lens face 11 and opposing the light-receiving element 8. As shown in FIG. 1 and FIG. 3, the third lens face 11 is formed into a spherical or aspherical convex lens face of which the convex surface faces the light-receiving element 8 side, and is formed so as to have an elliptical shape in a bottom view and a circular outer shape when viewed from the light-receiving element 8 side. As shown in FIG. 1, an optical axis OA(3) on the third lens face 13 is at an angle in relation to the lower end surface 2a.

As shown in FIG. 1, the monitor light Lm that has been totally reflected by the second monitor light total reflection surface 17 is internally incident on the third lens face 13, such as that described above, from the upper right side in FIG. 1 (interior of the optical receptacle 2). Then, the third lens face 13 emits the internally incident monitor light Lm towards the light-receiving element 8 side while converging the monitor light Lm. The monitor light Lm is coupled with the light-receiving element 8 in this way.

In the above-described configuration, the laser light La of the light-emitting element 7 that has been incident on the first lens face 11 can be separated into the fiber coupling light Lc and the monitor light Lm by total reflection at the coupling light total reflection surface 14 and total reflection at the first monitor light total reflection surface 15. Therefore, optical transmission accompanying monitoring, in which the fiber coupling light Lc is extracted in a direction along the semiconductor substrate 6 at the end face 5a of the optical fiber 5, can be appropriately actualized at low cost by only the surface shapes of the optical receptacle 2. In addition, the total reflection direction of the monitor light Lm is towards the right end surface 2c side in relation to the first monitor light total reflection surface 15. Therefore, compared to a configuration in which the monitor light Lm is totally reflected towards the left end surface 2d side, the left/right dimension of the optical receptacle 2 can be kept small. As a result, size reduction and further cost reduction of the optical receptacle 2 can be achieved.

In addition, in the above-described configuration, as a result of the second monitor light total reflection surface 17 being disposed further towards the lower end surface 2a side than the optical path of the fiber coupling light Lc, the third recessing section 18 can be deeply formed, and the amount of use of the forming material of the optical receptacle 2 can be reduced. Therefore, further cost reduction can be achieved. A configuration based on a concept such as this can be actualized with no difficulty in terms of design because the monitor light Lm is separated from the fiber coupling light Lc at the first monitor light total reflection surface 15, and in particular, the first monitor light total reflection surface 15 and the coupling light total reflection surface 14 are disposed in parallel.

As described above, in the above-described configuration, the optical axis OA(1) on the first lens face 11 is included on the boundary line BL between the coupling light total reflection surface 14 and the first monitor light total reflection surface 15 (see FIG. 2 and FIG. 5). However, the present invention is not limited to a configuration such as this. For example, the optical axis OA(1) may be shifted towards the side of either of the total reflection surfaces 14 and 15, in relation to the boundary line BL between the total reflection surfaces 14 and 15, thereby changing the light intensity ratio of the fiber coupling light Lc to the monitor light Lm from that of the above-described configuration (1:1).

In addition, various other variation examples, such as those described below, may be applied to the present invention.

First Variation Example

Figure 7:
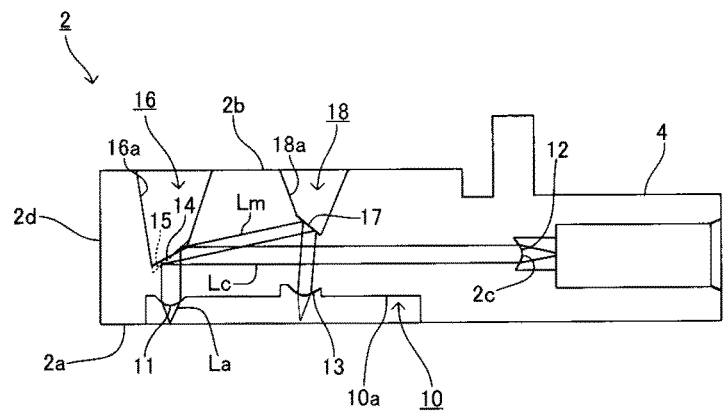
FIG. 7 A vertical cross-sectional view of a first variation example of the present invention FIG. 8 An enlarged cross-sectional view of a first main section of the first variation example FIG. 9 An enlarged cross-sectional view of a second main section of the first variation example FIG. 10 A vertical cross-sectional view of a second variation example of the present invention FIG. 11 A planar view of FIG. 10
Figure 8:
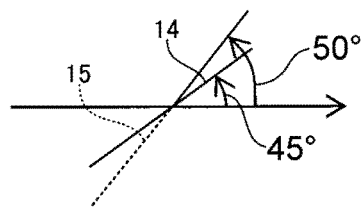
Figure 9:
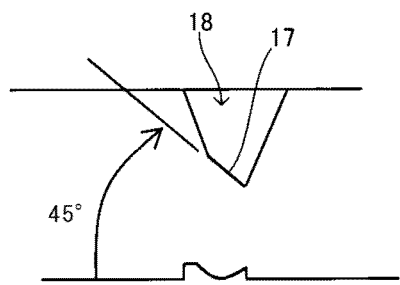

For example, as shown in FIG. 7 to FIG. 9, the second monitor light total reflection surface 17 may be disposed further towards the upper end surface 2b side than the optical path of the fiber coupling light Lc. In addition, the slope angle of the first monitor light total reflection surface 15 and the slope angle of the second monitor light total reflection surface 17 may be changed from those in FIG. 4 and FIG. 6 to ensure appropriate total reflection of the monitor light Lm at the second monitor light total reflection surface 17 that is disposed in this way.

Specifically, as shown in FIG. 8, in the present variation example, the slope angle of the first monitor light total reflection surface 15 is set to be a value (50°) that is greater than that in FIG. 4. In addition, as shown in FIG. 9, the slope angle of the second monitor light total reflection surface 17 is set to be a value (45°) that is smaller than that in FIG. 6.

As a result of a configuration such as this, the third recessing section 18 can be shallowly formed, and the surface area of the third recessing section 18 can be reduced. Releasability can be improved when the optical receptacle 2 is injection-molded using a mold, and mechanical strength can be enhanced.

Second Variation Example

Figure 10:
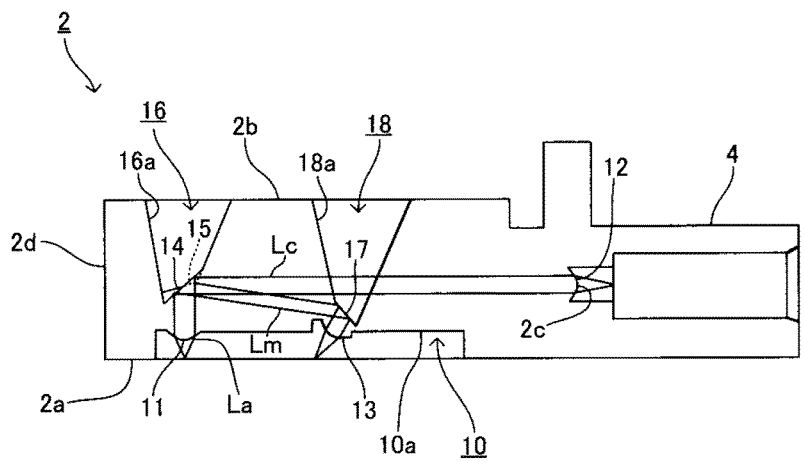

In addition, as shown in FIG. 10 to FIG. 13, two first monitor light total reflection surfaces 15 may be disposed in parallel, to the front and rear (direction perpendicular to the surface of the paper on which FIG. 10 is printed) of the coupling light total reflection surface 14. In addition, two second monitor light total reflection surfaces 17 may be disposed with spaces to the front and rear so as to correspond to the first monitor light total reflection surfaces 15. FIG. 10 corresponds to a cross-sectional view taken along B-B in FIG. 11.

Figure 11:
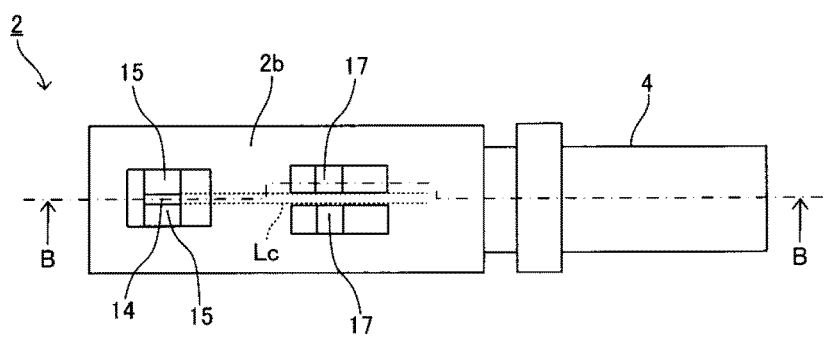
Figure 12:
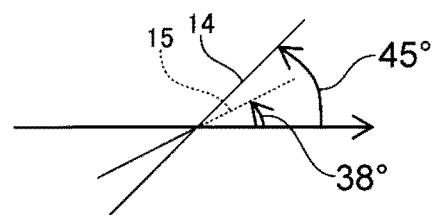
FIG. 12 An enlarged cross-sectional view of a main section of the second variation example FIG. 13 An enlarged planar view of the main section of the second variation example FIG. 14 A vertical cross-sectional view of a third variation example of the present invention FIG. 15 A planar view of FIG. 14
Figure 13:
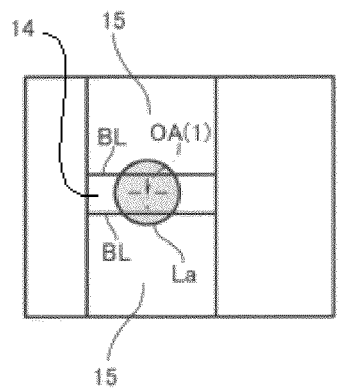

As shown in FIG. 11, in the present variation example, the optical path of the fiber coupling light Lc is secured between the two second monitor light total reflection surfaces 17. In addition, as shown in FIG. 10, the second monitor light total reflection surfaces 17 are each disposed further towards the lower end surface 2a side than the optical path of the fiber coupling light Lc. Furthermore, as shown in FIG. 12, the slope angles of the two first monitor light total reflection surfaces 15 are both the same angle (38°). The slope angles of the two second monitor light total reflection surfaces 17 are also both the same angle. Still further, the positions in which the two second monitor light total reflection surfaces 17 are disposed are the same in the lateral direction and the vertical (height) direction in FIG. 10. In addition, as shown in FIG. 11, the first monitor light total reflection surfaces 15 are each formed so as to be larger than the coupling light total reflection surface 14 in the front/back direction (up/down in FIG. 11).

As a result of a configuration such as this, the total amount of incident light that is incident on the first monitor light total reflection surfaces 15 can be made greater than the total amount of incident light that is incident on the coupling light total reflection surface 14. The amount of received monitor light Lm can be increased.

However, in the present variation example, the amount of incident light that is incident on the coupling light total reflection surface 14 (in other words, the amount of fiber coupling light Lc) and the total amount of incident light that is incident on the first monitor light total reflection surfaces 15 (in other words, the amount of monitor light Lm) can be arbitrarily adjusted depending on the width (front/back dimension) of the coupling light total reflection surface 14.

Third Variation Example

Figure 14:
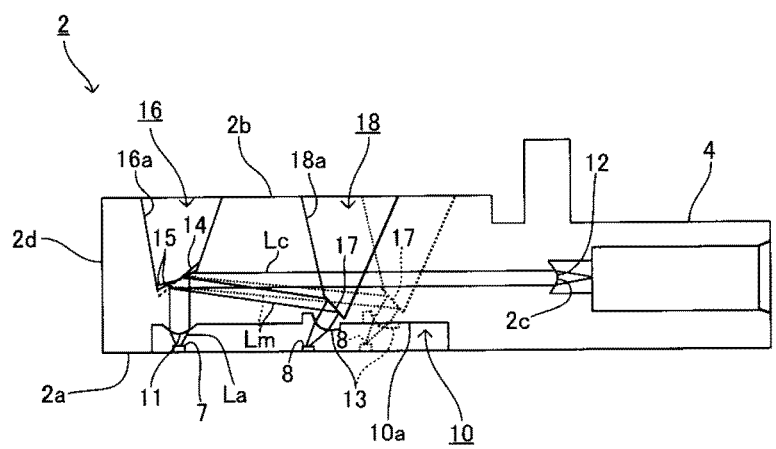
Figure 15:
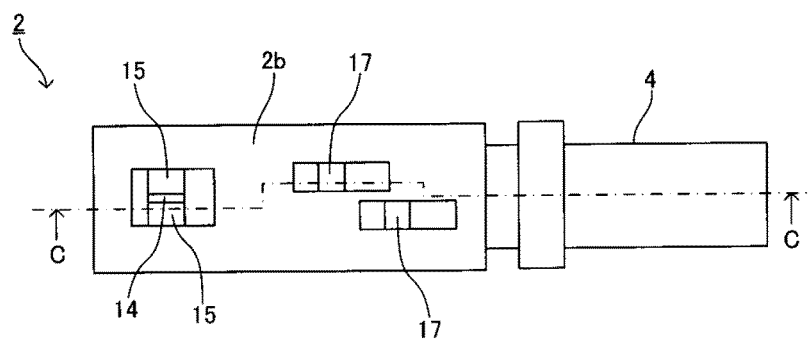
Figure 16:
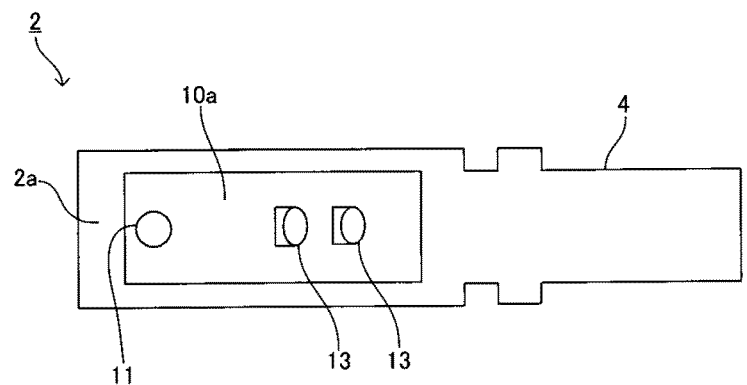
FIG. 16 A bottom view of FIG. 14

In addition, as shown in FIG. 14 to FIG. 18, in relation to the second variation example, the positions in which the two second monitor light total reflection surfaces 17 are disposed may be shifted to the left and right. Two light-receiving elements 8 and two third lens faces 11 may be disposed to respectively correspond to the second monitor light total reflection surfaces 17. FIG. 14 corresponds to a cross-sectional view taken along C-C in FIG. 15.

Figure 17:
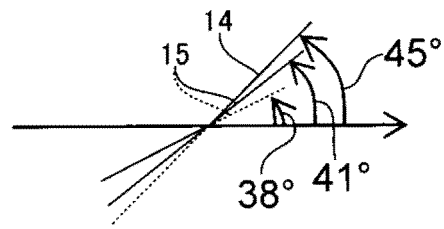
FIG. 17 An enlarged cross-sectional view of a first main section of the third variation example FIG. 18 An enlarged cross-sectional view of a second main section of the third variation example FIG. 19 A vertical cross-sectional view of a fourth variation example of the present invention FIG. 20 An enlarged cross-sectional view of a main section of the fourth variation example FIG. 21 A vertical cross-sectional view of a fifth variation example of the present invention FIG. 22 A planar view of FIG. 21
Figure 18:
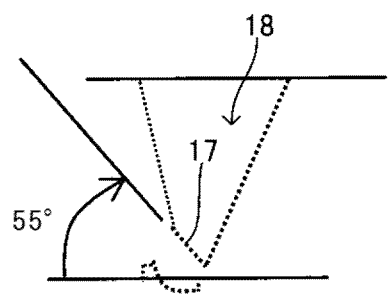

As shown in FIG. 17, in the present variation example, the slope angle of the first monitor light total reflection surface 15 on the front side differs from that in the second variation example (38°) and is set to 41°. Meanwhile, as shown in FIG. 18, the slope angles of the two monitor light total reflection surfaces 17 are both set to 55°.

As a result of a configuration such as this, monitoring in which two light-receiving elements 8 are used can be supported. In this instance, for example, one light-receiving element 8 may monitor light intensity, and the other light-receiving element 8 may monitor wavelength.

Fourth Variation Example

Figure 19:
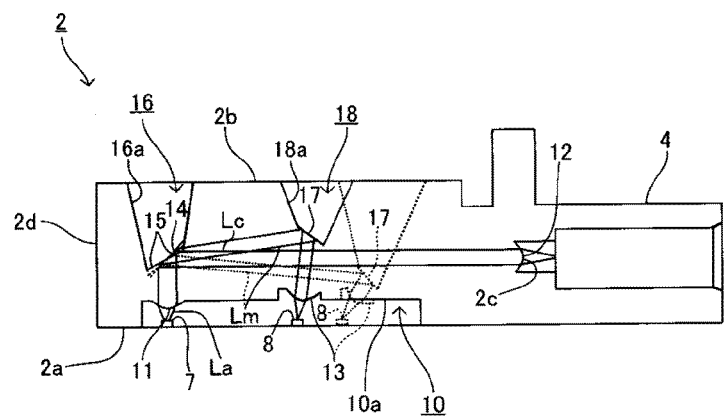
Figure 20:
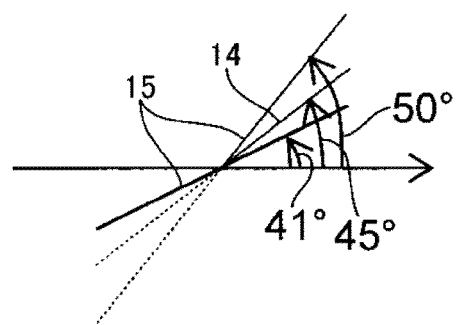

Furthermore, as shown in FIG. 19 and FIG. 20, in relation to the third variation example, the second monitor light total reflection surface 17 on the rear side may be disposed further towards the upper end surface 2b side than the optical path of the fiber coupling light Lc. As shown in FIG. 20, in the present variation example, the slope angle of the first monitor light total reflection surface 15 on the rear side differs from that in the third variation example (38°) and is set to 50°.

Fifth Variation Example

Figure 21:
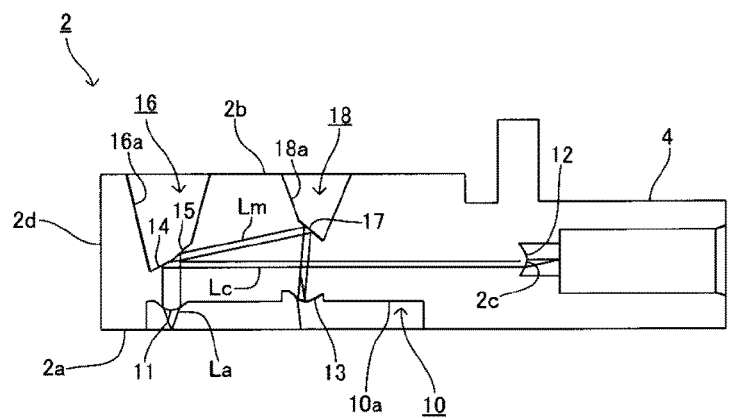
Figure 22:
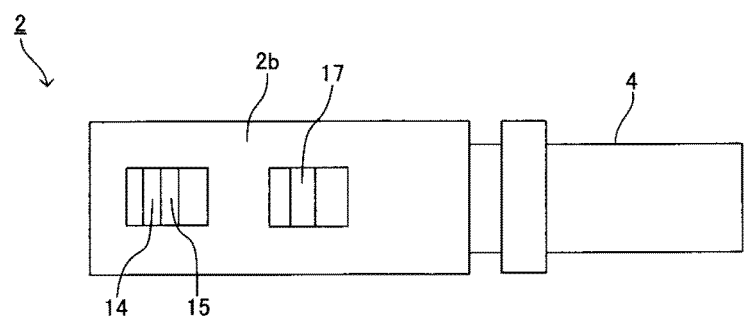
Figure 23:
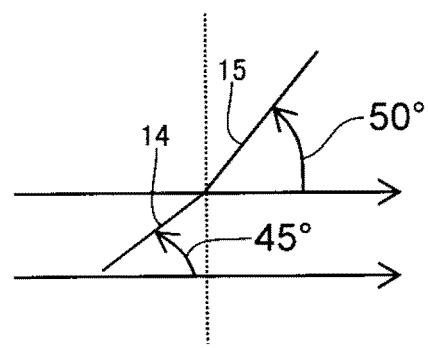
FIG. 23 An enlarged cross-sectional view of a main section of the fifth variation example FIG. 24 An enlarged planar view of the main section of the fifth variation example FIG. 25 A vertical cross-sectional view of an optical module showing a sixth variation example of the present invention FIG. 26 A schematic planar view of the optical receptacle shown in FIG. 25
Figure 24:
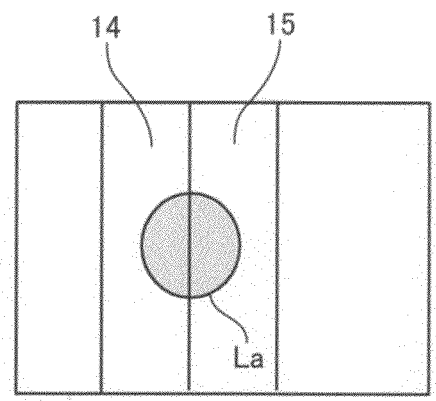

Still further, as shown in FIG. 21 to FIG. 24, the coupling light total reflection surface 14 and the first monitor light total reflection surface 15 may be disposed so as to be in linear-contact in the total reflection directions of the fiber coupling light Lc and the monitor light Lm (referred to, hereinafter, as serial disposition). As shown in FIG. 21, in the present variation example, the first monitor light total reflection surface 15 is serially disposed on the side of the total reflection direction of the fiber coupling light Lc (right side) in relation to the coupling light total reflection surface 14. In addition, as shown in FIG. 23, the slope angle of the coupling light total reflection surface 14 is set to 45° in the counter-clockwise direction in FIG. 23, in relation to the lower end surface 2a. In addition, the slope angle of the first monitor light total reflection surface is set to 50° in the counter-clockwise direction in FIG. 23, in relation to the lower end surface 2a. Furthermore, as shown in FIG. 21, the second monitor light total reflection surface 17 is disposed further towards the upper end surface 2b side than the optical path of the fiber coupling light Lc.

As a result of a configuration such as this, optical path design can be facilitated when the third recessing section 18 is to be shallowly formed to improve releasability during injection molding. In addition, surface area can be reduced by the coupling light total reflection surface 14 and the first monitor light total reflection surface 15 being directly connected without a stepped surface therebetween. Therefore, synergetic effects regarding improved releasability can be expected.

Sixth Variation Example

In addition, as shown in FIG. 25 to FIG. 28, a configuration that supports multi-channeling of the optical transmission accompanying monitoring, while including the features of the present invention, is also possible.

Figure 25:
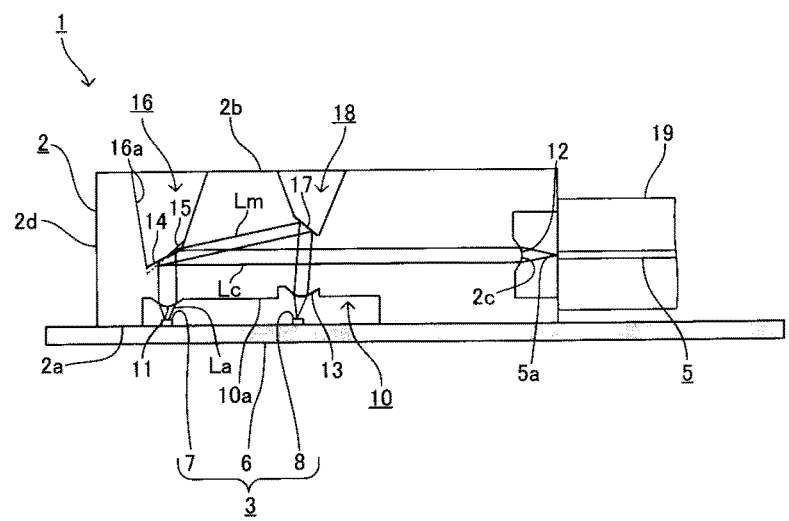
Figure 26:
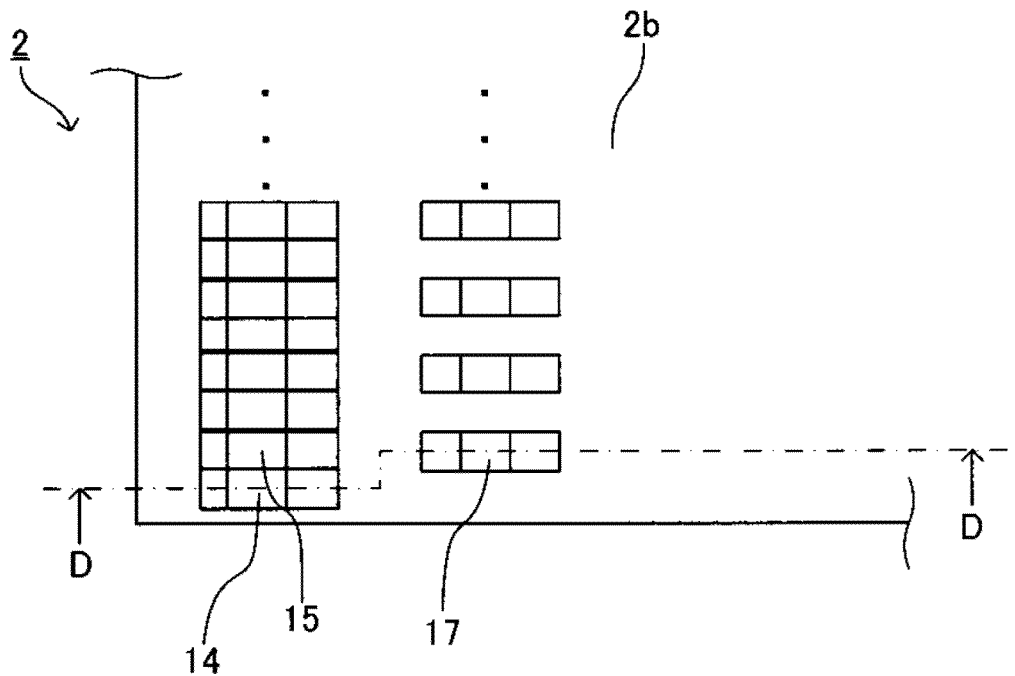
Figure 27:
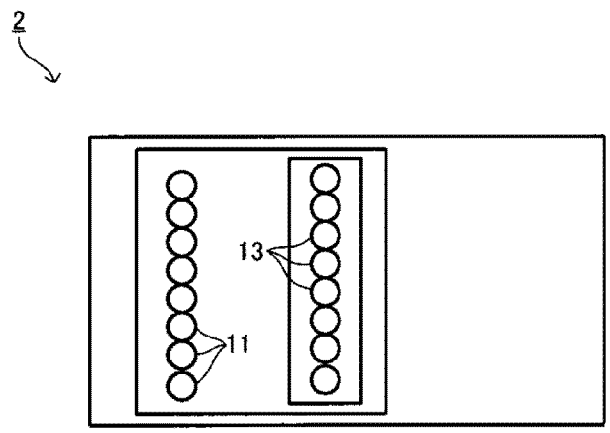
FIG. 27 A bottom view of the optical receptacle shown in FIG. 25
Figure 28:
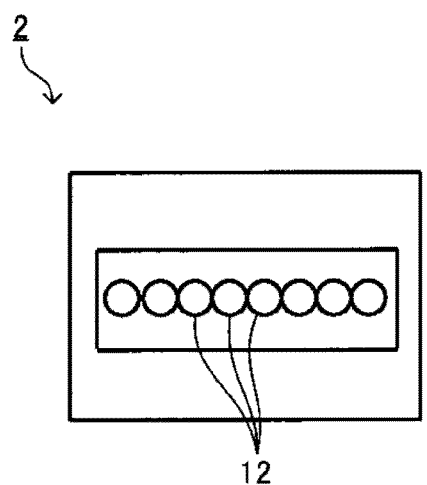
FIG. 28 A right-side view of the optical receptacle shown in FIG. 25

In other words, in the present variation example, the photoelectric conversion device 3 is configured so that a plurality (eight) of light-emitting elements 7 and a plurality (eight) of light-receiving elements 8 are each formed in an array in a direction perpendicular to the surface of the paper on which FIG. 25 is printed. In addition, in the present variation example, the same number of optical fibers 5 as the number of light-emitting elements 7 and the number of light-receiving elements 8 are disposed in an array along the same direction as the array direction of the light-emitting elements 7 and the light-receiving elements 8. In FIG. 25, the optical fibers 5 are attached to the optical receptacle 2 by a known attachment means in a state in which the optical fibers 5 are housed within a multi-core integrated connector 19.

In addition, in correspondence to the configurations of the photoelectric conversion device 3 and the optical fibers 5, such as that described above, the optical receptacle 2 is formed so that the same number of coupling light total reflection surfaces 14, first monitor light total reflection surfaces 15, second monitor light total reflection surfaces 17, and first to third lenses 11 to 13 as the number of light-emitting elements 7, light-receiving elements 8, and optical fibers 5 are formed in positions respectively corresponding to the light-emitting elements 7, the end faces 5a of the optical fibers 5, and the light-receiving elements 8, to enable an optical path between each light-emitting element 7 and each optical fiber 5 and an optical path between each light-emitting element 7 and each light-receiving element 8 to be formed. The optical receptacle 2 in FIG. 25 corresponds to a cross-section taken along D-D in FIG. 26.

In the present variation example, the laser light La of each light-emitting element 7 can be separated into the fiber coupling light Lc and the monitor light Lm of each light-emitting element 7 at the coupling light total reflection surface 14 and the first monitor light total reflection surface 15. Therefore, multi-channel optical transmission accompanying monitoring can be appropriately actualized at low cost.

The present invention is not limited to the above-described embodiment and may be variously modified to the extent that features thereof are not compromised.

Figure 29:
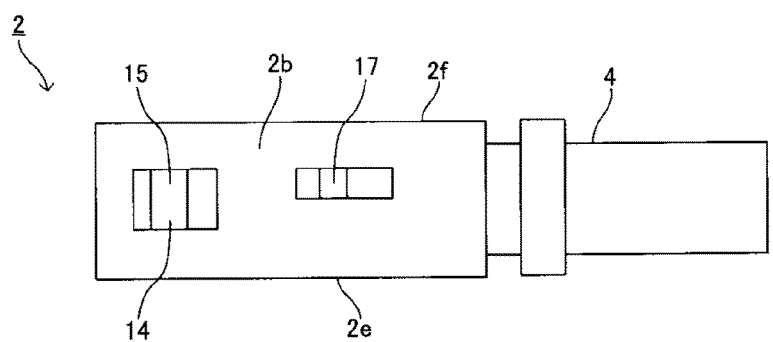
FIG. 29 A planar view of another variation example of the present invention

For example, according to the above-described embodiment, the slope angle of the first monitor light total reflection surface 15 is set to differ from that of the coupling light total reflection surface 14. However, as shown in FIG. 29, the slope angles of both total reflection surfaces 14 and 15 may be set to the same slope angle, thereby forming the total reflection surfaces 14 and 15 into a coplanar shape. In this instance, the monitor light Lm can be totally reflected at the first monitor light total reflection surface 15 in a state integrated with the fiber coupling light Lc. The monitor light Lm is subsequently totally reflected at the second monitor light total reflection surface 17 in a state separated from the fiber coupling light Lc.

As a result of a configuration such as this, the shapes of the coupling light total reflection surface 14 and the first monitor light total reflection surface 15 can be simplified, and further cost reduction can be achieved.

In addition, the present invention may be applied to an optical transmission body other than the optical fiber 5, such as an optical waveguide.

EXPLANATIONS OF LETTERS OR NUMERALS

1 optical module
2 optical receptacle
2a lower end surface
2b upper end surface
2c right end surface
3 photoelectric conversion device
5 optical fiber
6 semiconductor substrate
7 light-emitting element
8 light-receiving element
11 first lens face
12 second lens face
13 third lens face
14 coupling light total reflection surface
15 first monitor light total reflection surface
17 second monitor light total reflection surface

The invention claimed is:
1. An optical receptacle that is capable of optically coupling a light-emitting element and an optical transmission body in a state in which the optical receptacle is disposed between a photoelectric conversion device and the optical transmission body, in which photoelectric conversion device the light-emitting element and a light-receiving element that receives monitor light for monitoring light emitted from the light-emitting element are disposed on a substrate, said optical receptacle comprising:
   a first surface in an optical receptacle main body, on which the light from the light-emitting element is incident and from which the monitor light directed towards the light-receiving element is emitted;
   a coupling light total reflection surface that is disposed on a second surface on a side opposite to the first surface in the optical receptacle main body so as to have a predetermined first slope angle in relation to the first surface, on which coupling light total reflection surface a portion of the light from the light-emitting element that has been incident on the first surface is internally incident at an angle of incidence that is greater than a critical angle, wherein the internally incident portion of light is totally reflected by the coupling light total reflection surface towards the optical transmission body side as coupling light to be coupled with the optical transmission body;
   an end surface in the optical receptacle main body from which the coupling light that has been totally reflected by the coupling light total reflection surface is emitted towards the optical transmission body;

a first monitor light total reflection surface that is disposed on the second surface so as to be adjacent to the coupling light total reflection surface and have a predetermined second slope angle in relation to the first surface, on which first monitor light total reflection surface a remaining portion of light other than the portion of the light of the light-emitting element that has been incident on the first surface is internally incident at an angle of incidence that is greater than the critical angle, wherein the internally incident remaining portion of light is totally reflected by the first monitor light total reflection surface towards a third surface side as monitor light, in a state separated from the coupling light, wherein the coupling light total reflection surface and the first monitor light total reflection surface are formed on the second surface side by side as viewed from the light-emitting element such that the coupling light total reflection surface reflects the coupling light only, whereas the first monitor light total reflection surface reflects the monitor light only; and a second monitor light total reflection surface that is disposed on the third surface in a position on the side of the total reflection direction of the monitor light in relation to the first monitor light total reflection surface so as to have a predetermined third slope angle in relation to the first surface so as to deviate from the optical path of the coupling light, on which second monitor light total reflection surface the monitor light that has been totally reflected at the first monitor light total reflection surface is internally incident at an angle of incidence that is greater than the critical angle, wherein the internally incident monitor light is totally reflected by the second monitor light total reflection surface towards a position corresponding to the light-receiving element on the first surface.

2. The optical receptacle according to claim 1, wherein:
the first monitor light total reflection surface totally reflects the monitor light in a state separated from the coupling light by being disposed so as to have the second slope angle in relation to the first surface;
the coupling light total reflection surface and the first monitor light total reflection surface are disposed so as to be in point-contact in a direction perpendicular to the internal incidence direction of the light of the light-emitting element and the total reflection direction of the coupling light and the monitor light, or in linear-contact in the total reflection direction of the coupling light and the monitor light; and
the second monitor light total reflection surface is composed of an inner sloped surface of a recessing section that is formed on the second surface in a recessing manner.

3. The optical receptacle according to claim 2, wherein:
the coupling light total reflection surface and the first monitor light total reflection surface are disposed so as to be in point-contact; and
the second monitor light total reflection surface is disposed further towards the first surface side than the optical path of the coupling light.

4. The optical receptacle according to claim 2, wherein:
the second monitor light total reflection surface is disposed further towards the second surface side than the optical path of the coupling light.

5. The optical receptacle according to claim 2, wherein:
a plurality of first monitor light total reflection surfaces and second monitor light total reflection surfaces are disposed.

6. The optical receptacle according to any one of claim 2, wherein:
the coupling light total reflection surface and the first monitor light total reflection surface are disposed so as to be in linear-contact; and
the first monitor light total reflection surface is disposed towards the side of the total reflection direction of the coupling light in relation to the coupling light total reflection surface.

7. The optical receptacle according to claim 1, wherein:
the first monitor light total reflection surface totally reflects the monitor light in a state integrated with the coupling light by being disposed so as to have the first slope angle in relation to the first surface, and the monitor is separated from the coupling light at the second monitor light total reflection surface.

8. The optical receptacle according to claim 2, wherein:
a first lens face that enables the light of the light-emitting element to be incident towards the coupling light total reflection surface and the first monitor light total reflection surface is disposed on the first surface in a position corresponding to the light-emitting element;
a second lens face that emits the coupling light towards the optical transmission body is disposed on the third surface; and
a third lens face that emits the monitor light towards the light-receiving element is disposed on the first surface in a position corresponding to the light-receiving element.

9. An optical module comprising:
the optical receptacle according to claim 2; and
the photoelectric conversion device in which the light-emitting element and the light-receiving element that receives monitor light for monitoring light emitted from the light-emitting element are disposed on the substrate.

10. The optical receptacle according to claim 1, wherein:
the coupling light total reflection surface and the first monitor light total reflection surface formed on the second surface are both constituted by a bottom surface of a recessing section, an inner surface of which forms the second surface.

* * * * *